(12) United States Patent
Taga et al.

(10) Patent No.: US 6,584,255 B2
(45) Date of Patent: Jun. 24, 2003

(54) METHOD FOR MANUFACTURING OPTICAL FIBER CABLE WITH OPTICAL FIBERS WHOSE CHROMATIC DISPERSION VALUE ARE UNIFORMED

(75) Inventors: Hidenori Taga, Tokyo (JP); Koji Goto, Tokyo (JP)

(73) Assignee: KDDI Submarine Cable Systems Inc., Tokyo (JP)

( * ) Notice: Subject to any disclaimer, the term of this patent is extended or adjusted under 35 U.S.C. 154(b) by 0 days.

(21) Appl. No.: 10/124,183

(22) Filed: Apr. 16, 2002

(65) Prior Publication Data
US 2002/0150359 A1 Oct. 17, 2002

(30) Foreign Application Priority Data
Apr. 16, 2001 (JP) .......................... 2001-116268

(51) Int. Cl.[7] ................................. G02B 6/44
(52) U.S. Cl. ........................ 385/100; 385/123
(58) Field of Search .................. 385/100–114, 123, 385/95, 24

(56) References Cited
U.S. PATENT DOCUMENTS 5,611,016 A * 3/1997 Fangmann et al. ......... 385/100
5,905,838 A * 5/1999 Judy et al. ................. 385/123
6,421,484 B2 * 7/2002 Tanaka et al. .............. 385/100

* cited by examiner

*Primary Examiner*—Lynn D. Feild
*Assistant Examiner*—Son V. Nguyen
(74) *Attorney, Agent, or Firm*—Christie, Parker & Hale, LLP

(57) ABSTRACT

An object of this invention is to manufacture an optical fiber cable having optical fibers with small characteristic differences at a high yield.

Optical fibers in a first span are manufactured (S1), and each fiber is coated with a different color (S2). Each optical fiber is numbered in order of its chromatic dispersion value (S3). Optical fibers in a next span are manufactured (S4), and each optical fiber is arranged in order of its chromatic dispersion value (S5). Each optical fiber of the next span is coated with a color in inverse order to that of the antecedently connected optical fibers (S6). The optical fibers in the next span are connected to the antecedently connected optical fibers so that each optical fiber having a same color couples up (S7). Each connected optical fiber is renumbered in order of its chromatic dispersion value (S8). The operations of S4–S8 are repeated until reaching to a predetermined span number S9). When the optical fibers are connected as many the predetermined span number (S9), the optical fibers are bound up into one to make a cable (S10).

14 Claims, 5 Drawing Sheets

FIG. 4

| Optical fiber | Chromatic dispersion (ps/nm/km) | Color |
|---|---|---|
| #1-1 | -48 | Red |
| #1-2 | -50 | Blue |
| #1-3 | -51 | Yellow |
| #1-4 | -52 | Green |
| #1-5 | -53 | Purple |
| #1-6 | -57 | White |
| #1-7 | -58 | Black |
| #1-8 | -59 | Brown |

FIG. 5

| Optical fiber | Chromatic dispersion (ps/nm/km) | Color |
|---|---|---|
| #1-8, #2-1 | -108(= - 59 - 49) | Brown |
| #1-1, #2-8 | -109(= - 48 - 61) | Red |
| #1-3, #2-6 | -110(= - 51 - 59) | Yellow |
| #1-2, #2-7 | -110(= - 50 - 60) | Blue |
| #1-4, #2-5 | -110(= - 52 - 58) | Green |
| #1-5, #2-4 | -110(= - 53 - 57) | Purple |
| #1-7, #2-2 | -110(= - 58 - 52) | Black |
| #1-6, #2-3 | -111(= - 57 - 54) | White |

METHOD FOR MANUFACTURING OPTICAL FIBER CABLE WITH OPTICAL FIBERS WHOSE CHROMATIC DISPERSION VALUE ARE UNIFORMED

CROSS REFERENCE TO RELATED APPLICATIONS

This application is based upon and is entitled to the benefit of priority from the prior Japanese Patent Application No. 2001-116268, filed Apr. 16, 2001, the entire contents of which are incorporated herein by reference.

FIELD OF THE INVENTION

This invention relates to a manufacturing method of an optical fiber cable, and more specifically relates to a manufacturing method of an optical fiber cable having a plurality of optical fiber.

BACKGROUND OF THE INVENTION

An optical fiber cable is generally formed by binding up a plurality of optical fibers. Each optical fiber is coated with a jacket of a different color so as to visually differentiate each fiber easily. When eight optical fibers are to be bound, for example, jackets of white, blue, yellow, green, red, purple, brown, and orange are used. Also, jackets are sometimes identified by their patterns.

Conventionally, each optical fiber is coated with a jacket appropriate color at wire drawing. To manufacture a long haul optical fiber cable, a predetermined number of optical fibers respectively coated with a jacket of different color are bound up while optical fibers with a jacket of same color are fused in an axial direction.

In the conventional method, differences of transmission characteristics, for example, chromatic dispersion, of a plurality of optical fibers in one cable are considerable. Accordingly, it is difficult to match the transmission characteristics of each optical fiber. For example, when a dispersion compensating fiber is inserted to compensate accumulated chromatic dispersion in a cable, it is necessary to select a dispersion compensating amount, namely a length of dispersion compensating fiber one by one for every fiber. This operation becomes a severe burden.

Conventionally, to unify transmission characteristics of optical fibers in a cable, the transmission characteristics are previously measured to select optical fibers having similar characteristics and then an optical cable is manufactured using the selected fibers alone. However, in this method, a yield becomes quite low. That is, although a small number of optical fiber cables having unified characteristics are obtained, a large amount of material is merely wasted.

SUMMARY OF THE INVENTION

In accordance with the present invention, a method to manufacture an optical fiber cable containing n (n is an integer no less than 2) optical fibers is provided. In an initial step mutually different unique identifiers are added to the n optical fibers in a first span. In an identifier adding step the identifiers are added in order obtained when the n optical fibers in the first span are arranged according to a predetermined characteristic value to n optical fibers in a second span one by one wherein the n optical fibers in the second span are arranged in inverse order to that of the first span according to the predetermined characteristic value. In a connecting step the n optical fibers in the first span are connected to those in second span so that each optical fiber having the same identifier are coupled together. In a repeating step such operation is repeated until a desired span number that the identifiers in order obtained when the antecedently connected n optical fibers are arranged according to the predetermined characteristic value are added to n optical fibers in the following span one by one, wherein the n optical fibers in the following span are arranged in inverse order to that of a previous span according to the predetermined characteristic value and that the antecedently connected n optical fibers and those of the following span connect each other so that each optical fiber having a same identifier are coupled together.

With the above configuration, differences of predetermined characteristic values between optical fibers become smaller as the number of spans increases because the optical fibers are added so as to reduce the differences of the predetermined characteristic values between the optical fibers. It is not to select nor use optical fibers having a desired characteristic value alone but to use manufactured optical fibers in a wide range, and accordingly a high yield is achieved.

An identifier is a color and/or pattern of jacket to coat each optical fiber. A predetermined characteristic value is, for example, chromatic dispersion.

BRIEF DESCRIPTION OF THE DRAWING

The above and other objects, features and advantages of the present invention will be apparent from the following detailed description of the preferred embodiments of the invention in conjunction with the accompanying drawings, in which:

FIG. 4 is a corresponding table between chromatic dispersion values and colors of the optical fibers in the first span;

FIG. 5 is a corresponding table between chromatic dispersion values and colors of the optical fibers after the first and second spans are connected.

DETAILED DESCRIPTION

Embodiments of the invention are explained below in detail with reference to the drawings.

Figure 1:
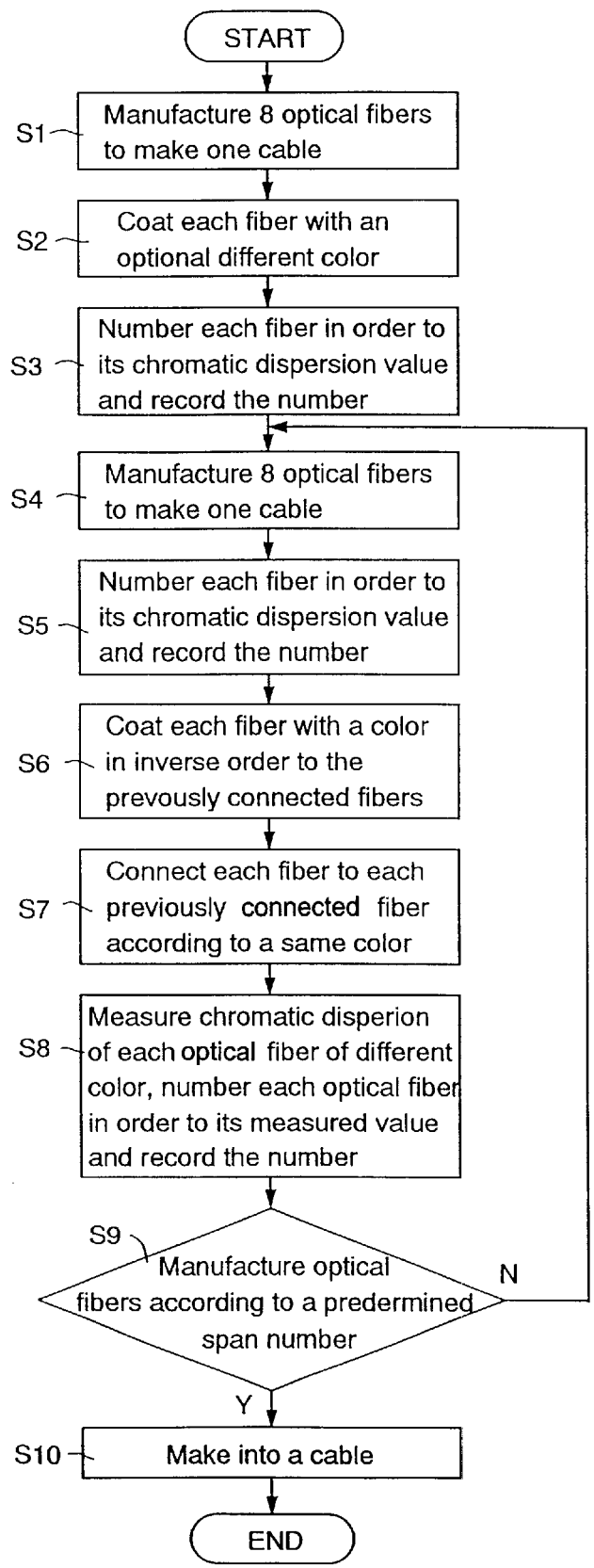
FIG. 1 shows a flow chart of an embodiment according to the invention.

FIG. 1 shows a flow chart of the operation of the present embodiment. Here, an example wherein eight optical fibers axe made into a cable is explained.

First of all, eight optical fibers in a first span to form a cable are manufactured (S1). Each optical fiber is coated with a different color (S2). Specifically, each optical fiber is coated with a jacket of different color. In this stage, it is optional which fiber is coated with which color. A chromatic dispersion value of each optical fiber is measured and each optical fiber is numbered and recorded in order of its measured value (S3).

Eight optical fibers in a second span are manufactured (S4) and a chromatic dispersion value of each optical fiber is measured, and then each optical fiber is arranged in order of its measured value of the chromatic dispersion (S5). Each optical fiber in the second span is coated with a color in inverse order to that in the first span (S6).

The optical fibers in the first span and those in the second span are connected go that each optical fiber having a same color are coupled together (S7). A chromatic dispersion value of each antecedently connected optical fiber is measured and each optical fiber is renumbered in order of its measured value (S8).

Eight optical fibers in a third span are manufactured (S4) and a chromatic dispersion value of each optical fiber is measured, and then each optical fiber is arranged in order of its measured value of the chromatic dispersion (S5). The optical fibers in the third span are coated with colors in inverse order to those (measured at S8) of the antecedently connected optical fibers in the first and second spans (S6). For instance, when a red optical fiber has a largest chromatic dispersion value in the total of the first and second spans, an optical fiber in the third span having a smallest chromatic dispersion value is coated with red.

The optical fibers in the third span are connected next to those in the second span in such manner that each optical fiber having a same color are coupled together (S7). A chromatic dispersion value of each antecedently connected optical fiber is measured and each optical fiber is renumbered in order of its measured value (S8).

The operations of S4–S8 are repeated until the optical fibers are connected to realize a predetermined number of spans (S9). When the optical fibers are connected to meet the predetermined number of spans (S9), they are bound up into one to make a cable together with some other well-known elements such as tension members (S10). It is also applicable to make the optical fibers into a cable bit by bit whenever the optical fibers in each span are connected.

For example, assuming that the relation between chromatic dispersion values and colors of optical fibers in the first span are those shown in FIG. 4. Assuming that chromatic dispersion values of the optical fibers in the second span are as follows:

An optical fiber #2-1: −49 ps/km/nm
An optical fiber #2-2: −52 ps/km/nm
An optical fiber #2-3: −54 ps/km/nm
An optical fiber #2-4: −57 ps/km/nm
An optical fiber #2-5: −58 ps/km/nm
An optical fiber #2-6: −59 ps/km/nm
An optical fiber #2-7: −60 ps/km/nm
An optical fiber #2-8: −61 ps/km/nm According to the step S3, jackets of the following colors are coated on respective optical fibers of #2-1 through 8.

The optical fiber #2-1: brown
The optical fiber #2-2: black
The optical fiber #2-3: white
The optical fiber #2-4: purple
The optical fiber #2-5: green
The optical fiber #2-6: yellow
The optical fiber #2-7: blue
The optical fiber #2-8: red FIG. 5 shows the optical fibers arranged in order of the chromatic dispersion values according to the results in which the optical fibers in the first and second spans are connected in such manner that each optical fiber having a same color are coupled together.

According to the step S6, the eight optical fibers in the third span are respectively coated with a jacket of white, black, purple, green, blue, yellow, red, and brown in order of the chromatic dispersion degrees, from small to large.

Figure 6:
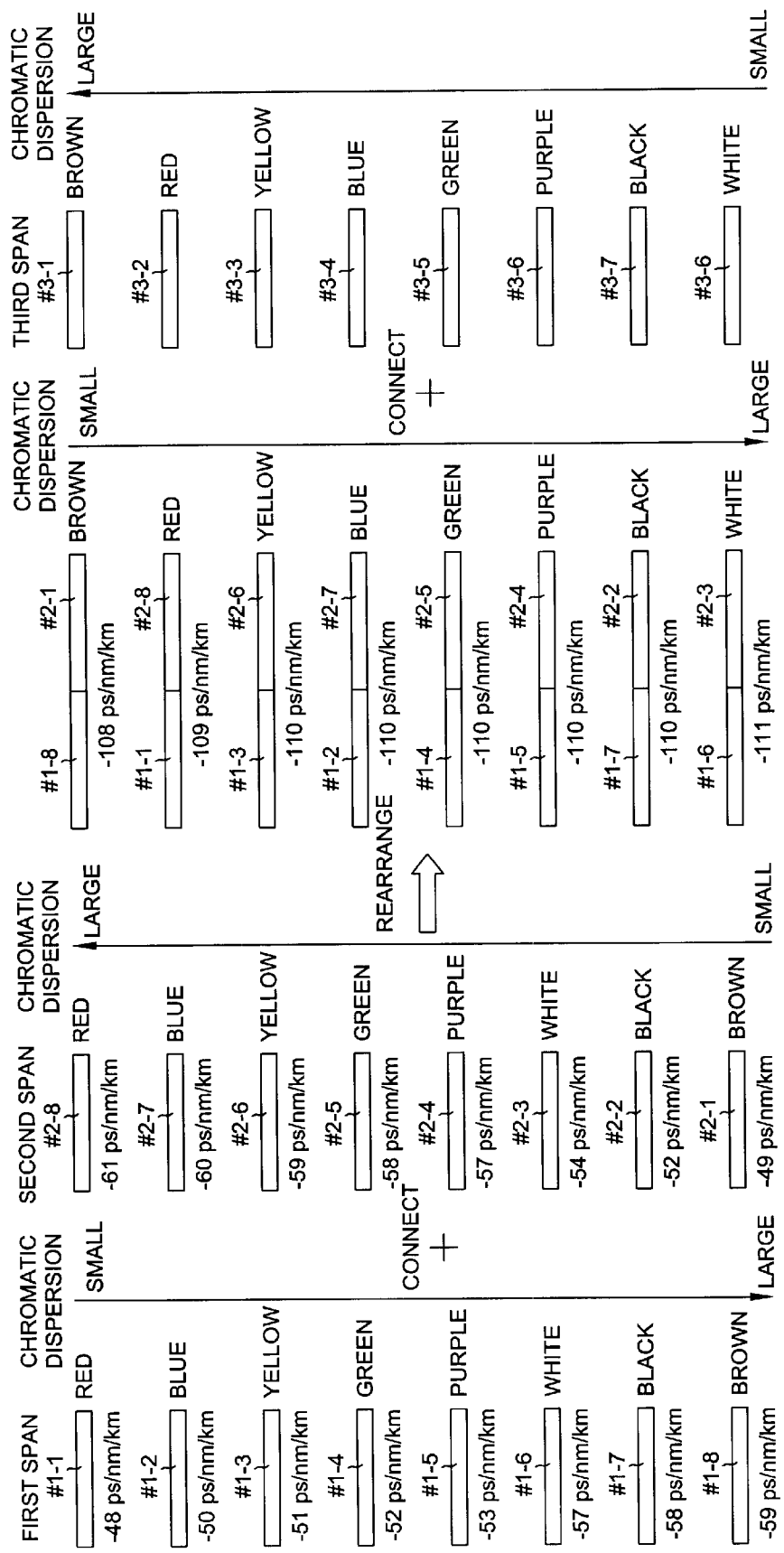
FIG. 6 depicts an embodiment of the invention involving first, second and third spans and connections and rearrangement thereof.

FIG. 6 depicts the three spans described with respect to FIGS. 4 and 5, showing the first span and the second span connection aspect, the rearrangement aspect thereof and the third span connection aspect.

As explained above, the operation to connect an optical fiber having a relatively large accumulative value (or average value) of chromatic dispersion with an optical fiber having a relatively small chromatic dispersion value and to connect an optical fiber having a relatively small accumulative value (or average value) of chromatic dispersion with an optical fiber having a relatively large chromatic dispersion value is repeated. Finally, the chromatic dispersion between the optical fibers is almost equalized and the differences of chromatic dispersion values are reduced.

Figure 2:
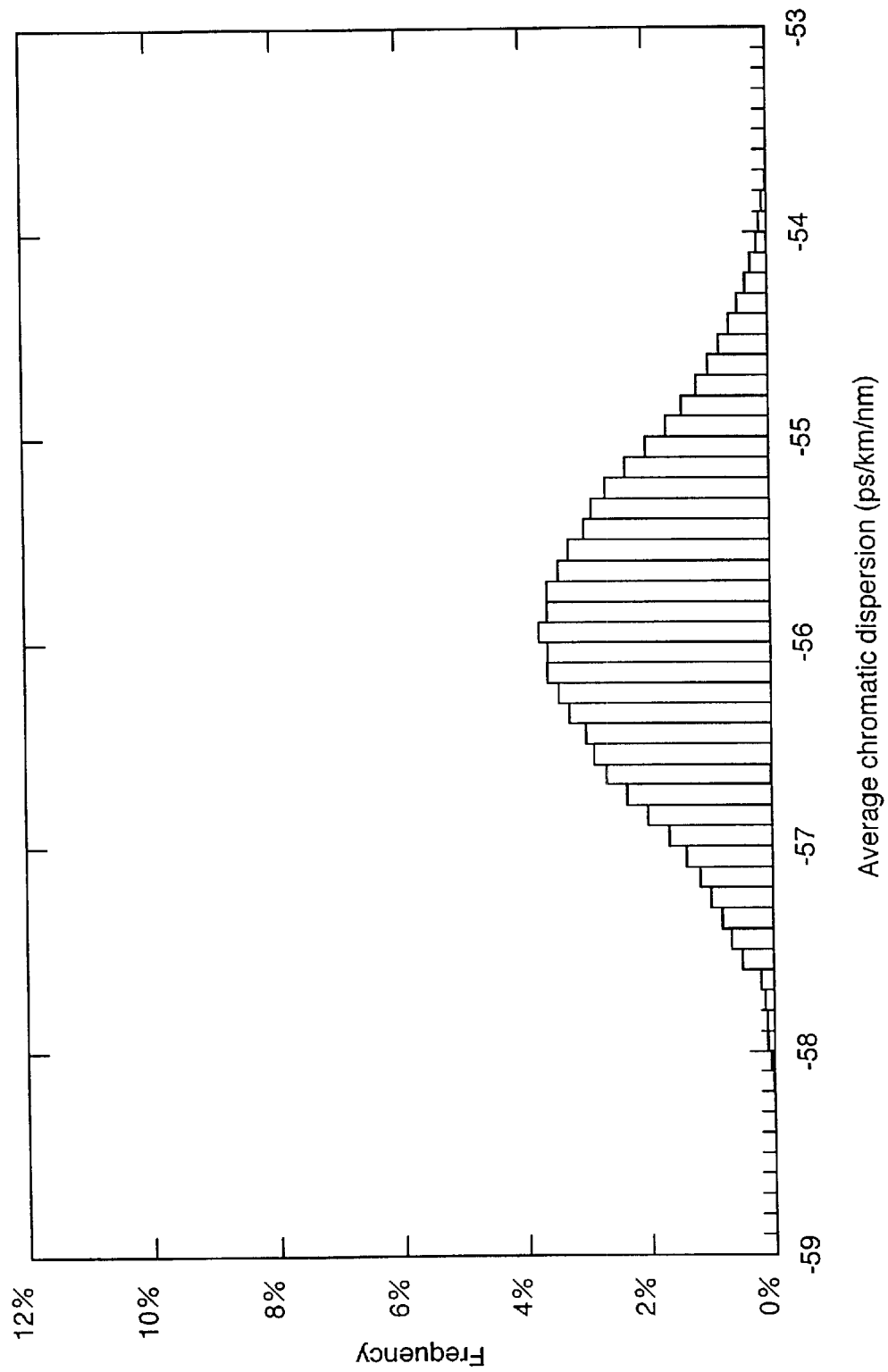
FIG. 2 shows a distribution of average chromatic dispersion of a conventional optical fiber cable.
Figure 3:
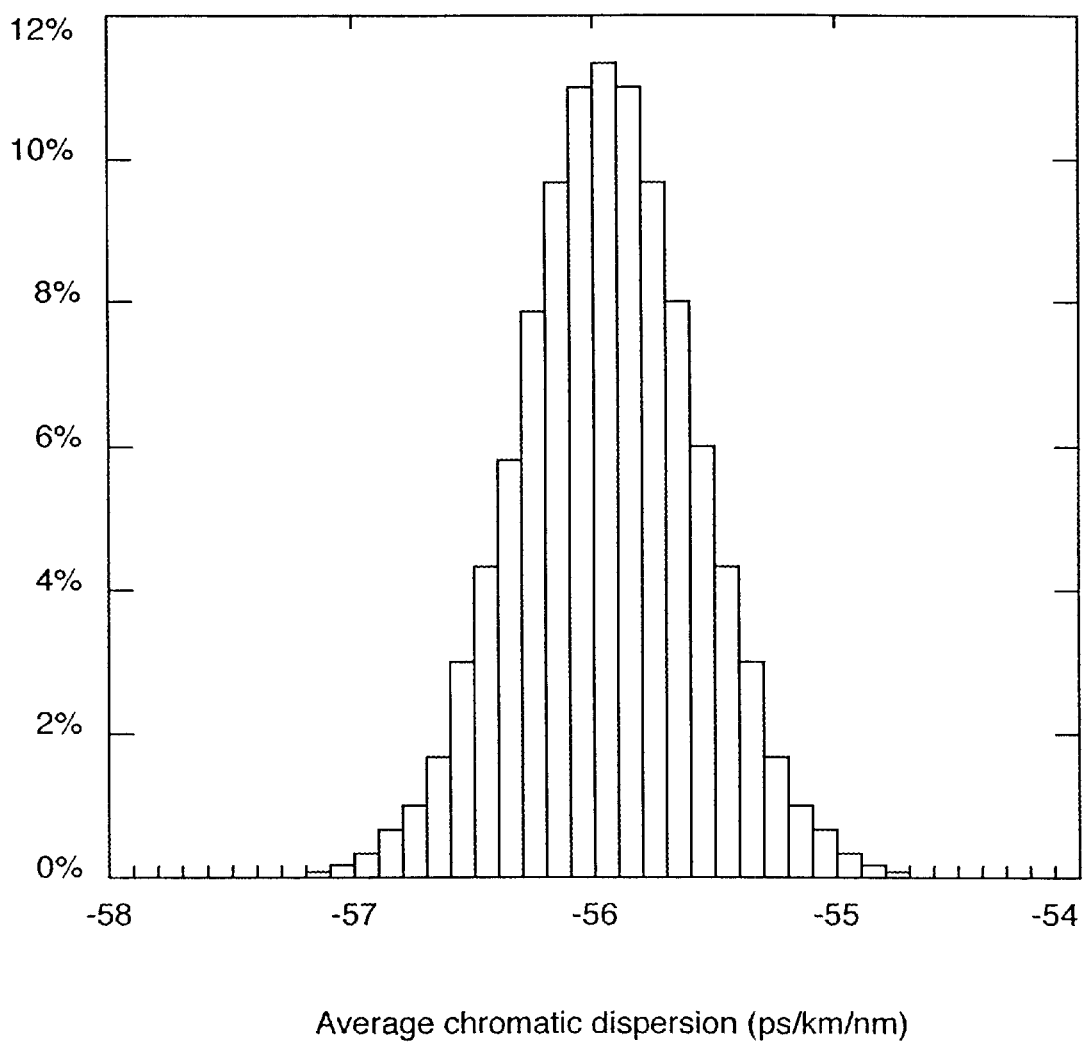
FIG. 3 shows a distribution of average chromatic dispersion of an optical fiber cable according to the embodiment.

In an example wherein optical fibers are made into a cable having a unit of 10 spans according to a normal distribution with an average chromatic dispersion of −56 ps/km/nm and an average deviation of 3.3 ps/km/nm., distributions of chromatic dispersion in both conventional and present embodiments are numerically simulated FIG. 2 shows a frequency distribution of an average chromatic dispersion when random optical fibers are combined into a cable. The horizontal axis expresses the chromatic dispersion and the vertical axis expresses the frequency. FIG. 3 shows a frequency distribution when the embodiment in accordance with the present invention is applied. The horizontal axis expresses the chromatic dispersion and the vertical axis expresses the frequency. The average deviation is 1.0 ps/km/nm in the conventional embodiment (FIG. 2), while the average deviation of the present embodiment (FIG. 3) is 0.36 ps/km/nm, which is one third of the conventional method.

In the present embodiment, its yield reaches 100% because basically no optical fibers are wasted. Also, it is unnecessary to stock many optical fibers. The yield of 100% and needlessness of stock is highly beneficial in manufacturing cables.

Although the present embodiment reduces the differences of chromatic dispersion values between optical fibers, some optical fibers sometimes exceed a permissible range. Such optical fibers are adjusted according to the following method. That is, when a chromatic dispersion value of an optical fiber is too large, the optical fiber is cut into a length so as to remove the excessive chromatic dispersion. On the other hand, when a chromatic dispersion value of an optical fiber is too small, an appropriate length of an optical fiber in stock having a large chromatic dispersion value is added to the optical fiber.

To make it easy to understand, such embodiment wherein optical fibers in each span are manufactured and then connected was explained above. However, obviously the same operating effect is also obtained in such a method wherein all optical fibers of desired spans are antecedently manufactured and then the optical fibers in each span are picked up in order to be connected according to the algorithm shown in FIG. 1.

Although each optical fiber is coated with a jacket of a characteristic color different from each other as a means to identify each optical fiber, it is also applicable to make each optical fiber differentiated using a pattern or combination of pattern and color. In addition, when each optical fiber is to be discriminated mechanically and connected automatically, an identifier of each optical fiber can be anything as far as it is mechanically identified.

As readily understandable from the aforementioned explanation, according to the invention, an optical fiber cable having small differences in characteristics between optical fibers inside the cable is manufactured. Compared to a method to select optical fibers having desired characteristics, the present invention achieves a high yield, idealistically a yield of 100%. Accordingly, no optical fibers are wasted and thus high productivity is obtained.

While the invention has been described with reference to the specific embodiment, it will be apparent to those skilled in the art that various changes and modifications can be made to the specific embodiment without departing from the spirit and scope of the invention as defined in the claims.

What is claimed is:

1. A method for manufacturing an optical fiber cable by connecting a plurality of spans having n optical fibers, n being an integer not less than 2, comprising:

providing a first span of n optical fibers having identifiers different from each other;

providing a second span of n optical fibers having identifiers different from each other, the identifiers of the n optical fibers of the second span in the reverse order of the magnitude of chromatic dispersion value being respectively identical to the identifiers of the n optical fibers of the first span in order of the magnitude of chromatic dispersion value;

calculating the sum of chromatic dispersion values of respective optical fibers in the first span and second span having the same identifier to arrange the respective optical fibers of the first and second spans in order of the magnitude of the sum of chromatic dispersion values; and connecting the optical fibers having the same identifier in the first and second spans.

2. The method of the claim 1, wherein the identifier includes a color of jacket to coat each optical fiber.

3. The method of claim 1, wherein the identifier includes a color and pattern of jacket to coat each optical fiber.

4. The method of claim 1, further comprising:

providing a third span having identifiers different from each other, the identifiers of the n optical fibers of the third span in the reverse order of the magnitude of chromatic dispersion values being respectively identical to the identifiers of the n optical fibers of the first and second spans in order of the magnitude of chromatic dispersion values;

connecting optical fibers having the same identifier in the second and third spans.

5. The method of claim 4, wherein the n optical fibers of the third span have substantially the same length.

6. The method of claim 1, wherein then optical fibers of the first span have substantially the same length and the n optical fibers of the second span have substantially the same length.

7. A method for manufacturing an optical fiber cable by connecting a plurality of spans having n optical fibers, n being an integer not less than 2, comprising:

arranging a first span of n optical fibers having identifiers different from each other in order of the magnitude of chromatic dispersion values to assign numbers;

arranging a second span of n optical fibers in the reverse order of the magnitude of chromatic dispersion values to assign numbers; and connecting the optical fibers having the same number in the first span and second span.

8. The method of claim 7, further comprising:

calculating the sum of chromatic dispersion values of respective optical fibers having the same number in the first and second spans to renumber the respective optical fibers in the first span and second span in order of the magnitude of the sum of chromatic dispersion values;

arranging a third span of n optical fibers in the reverse order of the magnitude of chromatic dispersion values to assign numbers; and connecting the renumbered optical fibers of the second span and the respective optical fibers of the third span having the same number.

9. The method of claim 8, wherein then optical fibers of the third span having substantially the same length.

10. The method of claim 7, wherein the n optical fibers of the first span have substantially the same length and the n optical fibers of the second span have substantially the same length.

11. The method of claim 10, wherein the n optical fibers of the first span have substantially the same length, the n optical fibers of the second span have substantially the same length, and the n optical fibers of the $k^{th}$ span have substantially the same length.

12. A method for manufacturing an optical fiber cable by connecting a plurality of spans having n optical fibers, n being an integer not less than 2, comprising:

providing a first span of n optical fibers having identifiers different from each other;

providing a second span of an optical fibers having identifiers different from each other; the identifiers of the n optical fibers of the second span in the reverse order of the magnitude of chromatic dispersion values being respectively identical to the identifiers of the n optical fibers of the first span in order of the magnitude of chromatic dispersion values;

providing a $k^{th}$ span of n optical fibers wherein k is an integer not less than 3;

calculating the sum of chromatic dispersion values of optical fibers from the first span to a $(k-1)^{th}$ span having the same identifier to arrange the respective optical fibers from the first span to the $(k-1)^{th}$ span in order of the magnitude of the sum of chromatic dispersion values, in relation with the $k^{th}$ span;

assigning identifiers different from each other to the n optical fibers of the $k^{th}$ span, the identifiers of the n optical fibers of the $k^{th}$ span in the reverse order of the magnitude of chromatic dispersion values being respectively identical to the identifiers of the n optical fibers of the first to $(k-1)^{th}$ spans in order of the magnitude of chromatic dispersion values; and connecting the optical fibers from the first to the $k^{th}$ spans having the same identifier.

13. The method of the claim 12, wherein the identifier includes a color of jacket to coat each optical fiber.

14. The method of claim 12, wherein the identifier includes a color and pattern of jacket to coat each optical fiber.

* * * * *